United States Patent Office 2,973,365
Patented Feb. 28, 1961

2,973,365

1-AROYLALKYL-4-ARYL-1,2,3,6-TETRAHYDRO-PYRIDINES

Paul A. J. Janssen, Antwerpse Steenweg 16', Vosselaar, near Turnhout, Belgium

No Drawing. Filed Apr. 9, 1959, Ser. No. 805,153

8 Claims. (Cl. 260—297)

This invention relates to a new group of tetrahydropyridine derivatives and more particularly to 1-aroylalkyl-4-aryl-1,2,3,6-tetrahydropyridines of the general structural formula

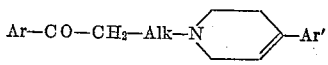

and the pharmaceutically useful non-toxic salts thereof, wherein Ar and Ar' are monocyclic aryl radicals, preferably of less than eleven carbon atoms and Alk is a lower alkylene radical of at least three carbon atoms.

The radicals Ar and Ar' can represent halophenyl radicals, such as fluorophenyl, chlorophenyl, bromophenyl, and iodophenyl; lower alkyloxyphenyl radicals, such as methoxyphenyl, ethoxyphenyl, and dimethoxyphenyl; and monocyclic aromatic hydrocarbon radicals, such as phenyl, tolyl, xylyl, ethylphenyl, propylphenyl, and butylphenyl. The radical Alk represents a lower alkylene radical such as butylene, propylene, trimethylene and tetramethylene, but is preferably ethylene.

The organic bases of this invention form pharmaceutically acceptable non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzene-sulfonate, ethyl toluenesulfonate, ethylene chlorohydrin, propylene chlorohydrin, allyl bromide, methallyl bromide and crotyl bromide.

The compounds of the invention can be prepared by condensing an aroylalkyl halide of the formula Ar—CO—CH₂—Alk—Halogen with an appropriately selected 4-aryl-1,2,3,6-tetrahydropyridine, wherein Ar is defined as above. The reaction can be carried out in an inert solvent such as an aromatic hydrocarbon, e.g. toluene, xylene; a lower alkanol, e.g. ethanol, butanol; or a lower alkanone, e.g. acetone, butanone, pentanone; and ethers such as dioxane. The reaction may be usefully accelerated by the use of elevated temperatures.

Alternatively, the compounds of the invention can be prepared by reacting an appropriately selected ω-(4-aryl-1,2,3,6-tetrahydropyridine)alkanonitrile with an aryl magnesium halide, decomposing the resulting complex and recovering the product. The ω-(4-aryl-1,2,3,6-tetrahydropyridine)alkanonitrile required for this synthesis can be prepared by condensing an ω-haloalkanonitrile with an appropriately selected 4-aryl-1,2,3,6-tetrahydropyridine.

The aroylalkyl halides used as intermediates can be prepared conveniently by the Friedel-Crafts reaction employing, for example, γ-chlorobutyryl chloride and benzene or an appropriately substituted benzene such as toluene and xylene, a halogenated benzene such as chlorobenzene, bromobenzene, and fluorobenzene, or an alkoxybenzene such as anisole and phenetole.

These intermediates can also be prepared by treating an ω-haloalkanonitrile with the appropriate arylmagnesium bromide followed by acid hydrolysis of the adduct.

The 4-aryl-1,2,3,6-tetrahydropyridines can be prepared according to the method of Schmidle (U.S. 2,784,192) by the condensation of α-methylstyrene, or an appropriate nuclearly substituted derivative thereof, with ammonia and formaldehyde to produce the corresponding 6-methyl-6-aryltetrahydro-1,3-oxazine. The acid hydrolysis of the 6-methyl-6-aryltetrahydro-1,3-oxazine yields the corresponding 4-aryl-1,2,3,6-tetrahydropyridine.

The compounds of the invention have useful pharmacological properties. They are potent anticonvulsants. They are also depressants of the central nervous system and exhibit marked tranquilizing effects in low dosage. They are also antipyretic, hypnotic and analgesic agents.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight. Temperatures are expressed in degrees centigrade (° C.), and pressures are expressed in millimeters of mercury (mm.).

Example 1

A solution of 71 parts of γ-chlorobutyryl chloride and 63 parts of benzene is added with stirring and cooling to a suspension of 71 parts of aluminum chloride in 310 parts of benzene. After the addition is completed, the cooling bath is removed, and the stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-chlorobutyrophenone boiling at 134–137° C. at 5 mm. pressure.

Example 2

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride are added. After the addition is completed, the cooling bath is removed and the stirring is continued for 2 hours. The reaction mixture is then poured into ice water. The organic layer is separated, washed with water, dried over anhydrous sodium sulfate, and filtered. The filtrate is concentrated under reduced pressure, and the reside is distilled to yield γ-chloro-p-fluorobutyrophenone boiling at 136–142° C. at 6 mm. pressure.

Example 3

A solution of 95 parts of cold methyl bromide in 356 parts of ether is added portionwise to a suspension of 24 parts of magnesium in 214 parts of ether. The mixture is refluxed for 2 hours. In the course of 90 minutes, 117.5 parts of p-tertiary butylacetophenone are added. The refluxing is continued for 3 hours. The mixture is stirred at room temperature for about 24 hours. The Grignard complex is destroyed by the addition of ammonium chloride and 10% hydrochloric acid solution. The mixture is extracted with ether. The ether extracts are washed with 10% sulfuric acid solution and then with water, dried over anhydrous calcium chloride, and filtered. The solution is concentrated in vacuo to remove the solvent. About 0.5 part of hydroquinone is added to the residue which is then heated to a temperature of 100–110° C. under 30 mm. pressure. The distillate is extracted with ether. The extracts are dried over anhydrous calcium chloride and filtered. A small quantity of hydroquinone is added to the solution which is fractionated by distillation to yield p-tertiary-butyl-α-methylstyrene boiling at 98° C. at 5 mm. pressure.

*Example 4*

A mixture of 856 parts of ammonium chloride and 3000 parts of 36% formaldehyde solution is stirred and heated to 60° C., 944 parts of α-methylstyrene are added slowly with cooling to maintain this temperature. After the addition is completed, the mixture is stirred at room temperature until the temperature of the reaction mixture drops to about 40° C. After 2000 parts of methanol are added, the stirring is continued for 20 hours. The methanol is removed in vacuo, and the residue is diluted with 2500 parts of concentrated hydrochloric acid. The mixture is then heated with stirring to a temperature of 100° C. for 4 hours, cooled, diluted with 2000 parts of water, and made alkaline by the addition of 15 normal sodium hydroxide solution. The reaction mixture is then extracted with benzene. The benzene extracts are dried over anhydrous potassium carbonate and filtered. The benzene is removed from the filtrate, and the residue is distilled in vacuo to yield 4-phenyl-1,2,3,6-tetrahydropyridine boiling at about 97–112° C. at 1 mm. pressure. This base is dissolved in benzene and dry hydrogen chloride gas is passed through the solution. The precipitated hydrochloride is collected on a filter. The 4-phenyl-1,2,3,6-tetrahydropyridine hydrochloride melts at about 199–202° C.

*Example 5*

A mixture of 15 parts of γ-chlorobutyrophenone, 24 parts of 4-phenyl-1,2,3,6-tetrahydropyridine, and 0.1 part of potassium iodide in 100 parts of toluene is heated at a temperature of 100–110° C. The reaction mixture is cooled and then filtered. The residue is extracted with a mixture of 100 parts of water and 100 parts of ether. The ether layer is separated and added to the filtrate from the original reaction mixture. The combined solutions are dried over anhydrous potassium carbonate and filtered. Dry, gaseous hydrogen chloride is introduced into the solution. The precipitate thus obtained is collected on a filter and recrystallized from a mixture of 2-propanol and acetone. In this manner there is obtained 1 - (γ - benzoylpropyl) - 4 - phenyl - 1,2,3,6 - tetrahydropyridine hydrochloride melting at about 195–196.2° C. The structural formula is

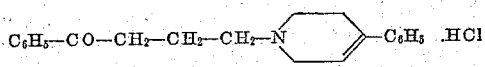

Substitution of 16.2 parts of δ-chloropentanophenone for the γ-chlorobutyrophenone in the foregoing procedure yields 1 - (δ - benzoylbutyl) - 4 - phenyl - 1,2,3,6 - tetrahydropyridine hydrochloride.

*Example 6*

Substitution of an equimolar amount of p-fluoroacetophenone for the p-tertiary-butylacetophenone in Example 3 yields p-fluoro-α-methylstyrene boiling at about 93–94° C. at 80 mm. pressure.

Substitution of an equimolar amount of p-fluoro-α-methylstyrene for the α-methylstyrene in Example 4 yields 4-(p-fluorophenyl)-1,2,3,6-tetrahydropyridine boiling at about 157–160° C. at 8 mm. pressure.

Substitution of 26.7 parts of 4-(p-fluorophenyl)-1,2,3,6-tetrahydropyridine for the 4-phenyl-1,2,3,6-tetrahydropyridine in Example 5 yields 1-(γ-benzoylpropyl)-4-(p-fluorophenyl) - 1,2,3,6 - tetrahydropyridine hydrochloride melting at about 182.6–183.6° C.

*Example 7*

Substitution of an equimolar amount of p-chloroacetophenone for the p-tertiary butylacetophenone in Example 3 yields p-chloro-α-methylstyrene boiling at about 83–85° C. at 15 mm. pressure.

Substitution of an equimolar amount of p-chloro-α-methylstyrene for the α-methylstyrene in Example 4 yields 4-(p-chlorophenyl)-1,2,3,6-tetrahydropyridine boiling at about 157–160° C. at 88 mm. pressure.

A mixture of 29.3 parts of 4-(p-chlorophenyl)-1,2,3,6-tetrahydropyridine, 15 parts of γ-chlorobutyrophenone, and 0.1 part of potassium iodide in 100 parts of toluene is heated for 70 hours at a temperature of 100–110° C. The contents of the flask are cooled and filtered. The solid residue is triturated with a mixture of 100 parts of ether and 100 parts of water. The ether layer is separated. To the filtrate from the original reaction mixture is added the ether layer. The solution is concentrated to induce the crystallization of 1-(γ-benzoylpropyl)-4-(p-chlorophenyl)-1,2,3,6-tetrahydropyridine. The solution is then cooled and the product collected on a filter. The white crystals melt at about 128–132.5° C.

*Example 8*

Substitution of an equimolar amount of p-bromoacetophenone for the p-tertiary-butylacetophenone in Example 3 yields p-bromo-α-methylstyrene boiling at about 103–106° C. at 15 mm. pressure.

Substitution of an equimolar amount of p-bromo-α-methylstyrene for the α-methylstyrene in Example 4 yields 4-(p-bromophenyl)-1,2,3,6-tetrahydropyridine boiling at about 162° C. at 3 mm. pressure.

Substitution of 36 parts of 4-(p-bromophenyl)-1,2,3,6-tetrahydropyridine for the 4-phenyl-1,2,3,6-tetrahydropyridine in Example 5 yields 1-(γ-benzoylpropyl)-4-(p-bromophenyl)-1,2,3,6 - tetrahydropyridine hydrochloride melting at about 211–214.5° C.

*Example 9*

Substitution of an equimolar amount of p-methylacetophenone for the p-tertiary-butylacetophenone in Example 3 yields p-methyl-α-methylstyrene boiling at about 72–74° C. at 13 mm. pressure.

Substitution of an equimolar amount of p-methyl-α-methylstyrene for the α-methylstyrene in Example 4 yields 4-(p-tolyl)-1,2,3,6-tetrahydropyridine boiling at about 162–170° C. at 10 mm. pressure.

Substitution of 26.1 parts of 4-(p-tolyl)-1,2,3,6-tetrahydropyridine for the 4-phenyl-1,2,3,6-tetrahydropyridine in Example 5 yields 1-(γ-benzoylpropyl)-4-(p-tolyl)-1,2,3,6-tetrahydropyridine hydrochloride melting at about 196.8–198° C.

*Example 10*

Substitution of an equimolar amount of p-ethylacetophenone for the p-tertiary-butylacetophenone in Example 3 yields p-ethyl-α-methylstyrene boiling at about 60–61° C. at 6 mm. pressure.

Substitution of an equimolar amount of p-ethyl-α-methylstyrene for the α-methylstyrene in Example 4 yields 4-(p-ethylphenyl)-1,2,3,6-tetrahydropyridine boiling at about 150–164° C. at 8 mm. pressure.

Substitution of 28 parts of 4-(p-ethylphenyl)-1,2,3,6-tetrahydropyridine for the 4-phenyl-1,2,3,6-tetrahydropyridine in Example 5 yields 1-(γ-benzoylpropyl)-4-(p-ethylphenyl)-1,2,3,6-tetrahydropyridine hydrochloride melting at about 177.2–180.8° C.

*Example 11*

Substitution of an equimolar amount of p-tertiary-butyl-α-methylstyrene for the α-methylstyrene in Example 4 yields 4-(p-tert-butylphenyl)-1,2,3,6-tetrahydropyridine.

Substitution of 32.4 parts of 4-(p-tert-butylphenyl)-1,2,3,6-tetrahydropyridine for the 4-phenyl-1,2,3,6-tetrahydropyridine in Example 5 yields 1-(γ-benzoylpropyl)-4-(p-tert-butylphenyl) - 1,2,3,6 - tetrahydropyridine hydrochloride melting at about 231–237.5° C.

Example 12

Substitution of an equimolar amount of o,p-dimethylacetophenone for the p-tertiary-butylacetophenone in Example 3 yields o,p-dimethyl-α-methylstyrene boiling at about 79–83° C. at 17 mm. pressure.

Substitution of an equimolar amount of o,p-dimethyl-α-methylstyrene for the α-methylstyrene in Example 4 yields 4-(o,p-xylyl)-1,2,3,6-tetrahydropyridine hydrochloride melting at about 216.8–220° C.

Substitution of 28.2 parts of 4-(o,p-xylyl)-1,2,3,6-tetrahydropyridine for the 4-phenyl-1,2,3,6-tetrahydropyridine in Example 5 yields 1-(γ-benzoylpropyl)-4-(o,p-xylyl)-1,2,3,6-tetrahydropyridine hydrochloride melting at about 192.8–194.2° C.

Example 13

A Grignard reagent is prepared from 6.7 parts of magnesium and 58 parts of m-bromofluorobenzene in 100 parts of ether. To this reagent is then added a solution of 26 parts of γ-chlorobutyronitrile in 80 parts of ether. After the addition is complete, the reaction mixture is refluxed and stirred for two hours. The mixture is then allowed to stand at room temperature for 15 hours. During the preceding operation, the mixture is kept under a nitrogen atmosphere. The excess Grignard reagent is decomposed by the addition of 56 parts of concentrated hydrochloric acid and 50 parts of water. The organic layer is separated, dried over anhydrous sodium sulfate and filtered. The filtrate is concentrated under reduced pressure and the residue is distilled to yield γ-chloro-m-fluorobutyrophenone boiling at about 105–125° C. at 2 mm. pressure.

Substitution of 16.5 parts of γ-chloro-m-fluorobutyrophenone for the γ-chlorobutyrophenone in Example 5 yields 1-[γ-(m-fluorobenzoyl)propyl]-4 - phenyl - 1,2,3,6-tetrahydropyridine hydrochloride melting at about 193–194.8° C.

Example 14

Substitution of 16.5 parts of γ-chloro-p-fluorobutyrophenone for the γ-chlorobutyrophenone in Example 5 yields 1-[γ-(p-fluorobenzoyl)propyl]-4 - phenyl - 1,2,3,6-tetrahydropyridine hydrochloride melting at about 186–187.4° C.

Example 15

Substitution of 26.7 parts of 4-(p-fluorophenyl)-1,2,3,6-tetrahydropyridine for the 4-phenyl-1,2,3,6-tetrahydropyridine in Example 14 yields 1-[γ-(p-fluorobenzoyl)propyl]-4-(p-fluorophenyl)-1,2,3,6-tetrahydropyridine hydrochloride melting at about 181.6–182.4° C.

Example 16

Substitution of an equimolar amount of m-bromochlorobenzene for the m-bromofluorobenzene in Example 13 yields γ,m-dichlorobutyrophenone boiling at about 128–135° C. at 2 mm. pressure.

Substitution of 17.8 parts of γ,m-dichlorobutyrophenone for the γ-chlorobutyrophenone in Example 5 yields 1-[γ-(m-chlorobenzoyl)propyl] - 4-phenyl - 1,2,3,6-tetrahydropyridine hydrochloride melting at about 210–212° C.

Example 17

Substitution of an equimolar amount of chlorobenzene for the fluorobenzene in Example 2 yields γ,p-dichlorobutyrophenone boiling at about 185–190° C. at 12 mm. pressure.

Substitution of 17.8 parts of γ,p-dichlorobutyrophenone for the γ-chlorobutyrophenone in Example 5 yields 1-[γ-(p-chlorobenzoyl)propyl]-4-phenyl - 1,2,3,6 - tetrahydropyridine hydrochloride melting at about 213.5–216.5° C.

Example 18

Substitution of an equimolar amount of bromobenzene for fluorobenzene in Example 2 yields γ-chloro-p-bromobutyrophenone boiling at about 150–157° C. at 6 mm. of pressure.

Substitution of 21.3 parts of γ-chloro-p-bromobutyrophenone for the γ-chlorobutyrophenone in Example 5 yields 1-[γ-(p-bromobenzoyl)propyl]-4 - phenyl - 1,2,3,6-tetrahydropyridine hydrochloride melting at about 227–228.5° C.

Example 19

Substitution of an equimolar amount of toluene for the fluorobenzene in Example 2 yields γ-chloro-p-methylbutyrophenone boiling at 145° C. at 5 mm. pressure.

In a bomb a mixture of 26.7 parts of 4-(p-fluorophenyl)-1,2,3,6-tetrahydropyridine, 16.2 parts of γ-chloro-p-methylbutyrophenone, and 0.1 part of potassium iodide in 100 parts of toluene is heated for 72 hours at a temperature of 145–150° C. The contents of the bomb are cooled. The reaction mixture is filtered, and the remaining solid is triturated with 100 parts of water and 100 parts of ether. The ether layer is separated and added to the filtrate from the original reaction mixture. A portion of the ether is evaporated in order to induce crystallization of the product. The precipitate thus obtained is collected on a filter and recrystallized from a mixture of 2-propanol and acetone to yield 1-[γ-(p-methylbenzoyl)propyl]-4 - (p - fluorophenyl) - 1,2,3,6 - tetrahydropyridine melting at about 125–126° C.

Example 20

In an open flask a mixture of 16.2 parts of γ-chloro-p-methylbutyrophenone, 29.2 parts of 4-(p-chlorophenyl)-1,2,3,6-tetrahydropyridine, and 0.1 part of potassium iodide in 110 parts of toluene is heated for 50 hours at a temperature of 100–110° C. The contents of the flask are cooled and filtered. The filtrate is dried over anhydrous potassium carbonate. Anhydrous hydrogen chloride gas is passed through the solution, whereupon there precipitates the hydrochloride. The salt is collected on a filter and recrystallized from a mixture of 2-propanol and acetone to yield 1-[γ-(p-tolyl)propyl]-4-(p-chlorophenyl)-1,2,3,6-tetrahydropyridine hydrochloride melting at about 212.5–214° C.

Example 21

Substitution of 26 parts of 4-(p-tolyl)-1,2,3,6-tetrahydropyridine for the 4-(p-chlorophenyl)-1,2,3,6-tetrahydropyridine in Example 20 yields 1-[γ-(p-methylbenzoyl)propyl]-4-(p-tolyl) - 1,2,3,6 - tetrahydropyridine hydrochloride melting at about 212–215° C.

Example 22

A mixture of 63 parts of γ-chlorobutyronitrile, 96 parts of 4-phenyl-1,2,3,6-tetrahydropyridine, and 0.5 part of potassium iodide in 500 parts of toluene is heated at 100–110° C. for 70 hours. The mixture is cooled. The organic layer is separated, dried over anhydrous potassium carbonate, and filtered. Dry hydrogen chloride gas is passed through the solution. The precipitated salt is collected on a filter and recrystallized from a mixture of acetone and 2-propanol to yield γ-(4-phenyl-1,2,3,6-tetrahydropyridine)-butyronitrile hydrochloride melting at about 191–192° C.

m-(trifluoromethyl)phenylmagnesium bromide is prepared by adding a solution of 28.1 parts of m-bromotrifluoromethylbenzene in 80 parts of dry ether to 3.04 parts of magnesium turnings. After the addition is complete, stirring and refluxing is continued for 2 hours.

To 130 parts of this Grignard reagent is added with stirring a solution of 18.9 parts of γ-(4-phenyl-1,2,3,6-tetrahydropyridine)butyronitrile in 40 parts of ether and 90 parts of benzene in the course of 30 minutes. Stirring and refluxing are continued for 5 hours. The reaction mixture is permitted to stand at room temperature for 24 hours. A solution of 25 parts of ammonium chloride in 75 parts of water is added, and the organic solvents are evaporated. The water lost during the evaporation is replaced. The mixture is refluxed for 1 hour, cooled, and extracted with ether. The ether extract is extracted with cold 2 N hydrochloric acid. An oily layer forms, which soon solidifies. The solid is collected by filtration. The ether layer is separated and discarded. The aqueous layer, together with the precipitate, is treated with sodium hydroxide solution. The free base is extracted with ether. The ether solution is dried over anhydrous potassium carbonate and dry, gaseous hydrogen chloride is passed through the solution, whereupon a finely divided precipitate is obtained. The ether is evaporated, and the residue is purified by recrystallization from a cooled mixture of acetone and 2-propanol in the presence of activated charcoal. In this manner there is thus obtained 1 - [γ - (m - trifluoromethylbenzoyl)propyl] - 4-phenyl-1,2,3,6-tetrahydropyridine hydrochloride melting at about 178.2–179.4° C.

*Example 23*

Substitution of an equimolar amount of m-xylene for the fluorobenzene in Example 2 yields γ-chloro-2,4-dimethylbutyrophenone.

Substitution of 17.3 parts of γ-chloro-2,4-dimethylbutyrophenone for the γ-chlorobutyrophenone in Example 5 yields 1-[γ-(2',4'-dimethylbenzoyl)propyl]-4-phenyl-1,2,3,6-tetrahydropyridine hydrochloride melting at about 197.6–199° C.

*Example 24*

Substitution of an equimolar amount of p-dimethylbenzene for the fluorobenzene in Example 2 yields γ-chloro-2,5-dimethylbutyrophenone boiling at about 142–148° C. at 6 mm. pressure.

Substitution of 17.3 parts of γ-chloro-2,5-dimethylbutyrophenone for the γ-chlorobutyrophenone in Example 5 yields 1-[γ-(2',5'-dimethylbenzoyl)propyl]-4-phenyl-1,2,3,6-tetrahydropyridine hydrochloride melting at about 174–177° C.

*Example 25*

Substitution of 29.3 parts of 4-(p-chlorophenyl)-1,2,3,6-tetrahydropyridine for the 4-phenyl-1,2,3,6-tetrahydropyridine in Example 23 yields 1-[γ-(2',4'-dimethylbenzoyl)propyl] - 4 - (p - chlorophenyl) - 1,2,3,6 - tetrahydropyridine hydrochloride melting at about 214–216° C.

*Example 26*

A mixture of 94 parts of phenol and 142 parts of γ-chlorobutyryl chloride is refluxed for 3 hours. The mixture is then fractionated in vacuo to yield the phenol ester of γ-chlorobutyric acid boiling at about 140–143° C. at 10 mm. pressure.

To a solution of 77 parts of aluminum chloride in 760 parts of nitrobenzene are added slowly under stirring 100 parts of the phenol ester of γ-chlorobutyric acid. After the addition is completed, the stirring is continued for 18 hours at room temperature. The reaction mixture is then poured into a mixture of 240 parts of concentrated hydrochloric acid and 400 parts of ice. The solution is filtered. The remaining solid is taken up in 142 parts of ether. The residual water is separated, and the solution is diluted with 50 parts of petroleum ether. The solution is cooled and scratched. The γ-chloro-p-hydroxybutyrophenone is collected on a filter and found to melt at about 114–115.2° C.

Substitution of 16.3 parts of γ-chloro-p-hydroxybutyrophenone for the γ-chlorobutyrophenone in Example 5 yields 1-[γ-(p-hydroxybenzoyl)propyl]-4-phenyl-1,2,3,6-tetrahydropyridine hydrochloride melting at about 271–272.5° C.

*Example 27*

Substitution of an equimolar amount of anisole for the fluorobenzene in Example 2 yields γ-chloro-p-methoxybutyrophenone boiling at 175° C. at 6 mm. pressure.

In a sealed reactor a mixture of 24 parts of 4-phenyl-1,2,3,6-tetrahydropyridine, 17.5 parts of γ-chloro-p-methoxybutyrophenone, and 0.1 part of potassium iodide in 100 parts of toluene is heated for 50 hours at a temperature of 120–125° C. After cooling, the reaction mixture is filtered. The filtrate is concentrated and then cooled. The precipitate thus obtained is collected on a filter and recrystallized from a fixture of 2-propanol and acetone to yield 1-[γ-(p-anisoyl)propyl]-4-phenyl-1,2,3,6-tetrahydropyridine melting at about 122.2–123.4° C.

This base is dissolved in ether. Dry, gaseous hydrogen chloride is passed through the solution, whereupon there precipitates the hydrochloride. The salt is collected on a filter and recrystallized from a mixture of 2-propanol and acetone to yield 1-[γ-(p-anisoyl)propyl]-4-phenyl-1,2,3,6-tetrahydropyridine hydrochloride melting at about 202.5–204° C.

*Example 28*

Substitution of 26.7 parts of 4-(p-fluorophenyl)1,2,3,6-tetrahydropyridine for the 4-phenyl-1,2,3,6-tetrahydropyridine for the 4-phenyl-1,2,3,6-tetrahydropyridine in Example 27 yields 1-[γ-(p-anisoyl)-propyl]-4-(p-fluorophenyl)-1,2,3,6-tetrahydropyridine melting at about 117.8–120° C.

*Example 29*

Substitution of 29.3 parts of 4-(p-chlorophenyl)-1,2,3,6-tetrahydropyridine in Example 27 yields 1[γ-(p-anisoyl)-propyl] - 4 - (p-chlorophenyl)-1,2,3,6-tetrahydropyridine melting at about 138–139° C.

*Example 30*

Substitution of 26.1 parts of 4-(p-methylphenyl)-1,2,3,6-tetrahydropyridine for the 4-phenyl-1,2,3,6-tetrahydropyridine in Example 27 yields 1-[γ-(p-anisoyl)-propyl]-4-(p-tolyl)-1,2,3,6-tetrahydropyridine melting at about 127–128.5° C.

*Example 31*

Substitution of an equimolar amount of phenetole for the fluorobenzene in Example 2 yields γ-chloro-p-ethoxybutyrophenone melting at about 50.4–51.8° C.

Substitution of 18.6 parts of γ-chloro-p-ethoxybutyrophenone for the γ-chlorobutyrophenone in Example 5 yields 1 - [γ-(p-ethoxybenzoyl)propyl]-4-phenyl-1,2,3,6-tetrahydropyridine hydrochloride melting at about 174.2–176° C.

*Example 32*

Substitution of an equimolar amount of propoxybenzene for the fluorobenzene in Example 2 yields γ-chloro-p-propoxybutyrophenone boiling at 183° C. at 6 mm. pressure.

Substitution of 19.7 parts of γ-chloro-p-propoxybutyrophenone for the γ-chlorobutyrophenone in Example 5 yields 1 - [γ-(p-propoxybenzoyl)propyl]-4-phenyl-1,2,3,6-tetrahydropyridine hydrochloride melting at about 175–176.2° C.

*Example 33*

Substitution of an equimolar amount of butyl phenyl ether for the fluorobenzene in Example 2 yields γ-chloro-p-butoxybutyrophenone melting at 36.8–38° C.

Substitution of 20.9 parts of γ-chloro-p-butoxybutyrophenone for the γ-chloro-p-methoxybutyrophenone in Example 27 yields 1-[γ-(p-butoxybenzoyl)-propyl]-4-phenyl-1,2,3,6-tetrahydropyridine melting at about 111.2–112.2° C.

*Example 34*

Substitution of an equimolar amount of o-dimethoxybenzene for the fluorobenzene in Example 2 yields γ-chloro-m,p-dimethoxybutyrophenone melting at about 92–93° C.

Substitution of 19.9 parts of γ-chloro-m,p-dimethoxybutyrophenone for the γ-chlorobutyrophenone in Example 5 yields 1-[γ-(m,p-dimethoxybenzoyl)propyl]-4-phenyl-1,2,3,6-tetrahydropyridine hydrochloride melting at about 198–199° C.

What is claimed is:

1. A compound of the formula

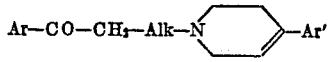

wherein Ar and Ar' are members of the class consisting of halophenyl, methoxyphenyl, ethoxyphenyl, dimethoxyphenyl and phenyl, lower alkylphenyl and xylyl, and wherein Alk is lower alkylene containing 2–4 carbon atoms.

2. 1-[γ-(p-fluorobenzoyl)propyl]-4-)p-fluorophenyl)-1,2,3,6-tetrahydropyridine.

3. 1-[γ-(p-fluorobenzoyl)propyl]-4-phenyl-1,2,3,6-tetrahydropyridine.

4. 1-(γ-benzoylpropyl)-4-phenyl-1,2,3,6-tetrahydropyridine.

5. A compound of the formula

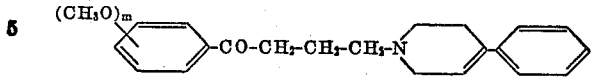

wherein $m$ is a positive integer less than 3.

6. 1[γ-(p-methoxybenzoyl)propyl]-4-phenyl-1,2,3,6-tetrahydropyridine.

7. 1-[γ-(m,p-dimethoxybenzoyl)propyl]-4-phenyl-1,2,3,6-tetrahydropyridine.

8. 1 - [γ-(p-hydroxybenzoyl)propyl]-4-phenyl-1,2,3,6-tetrahydropyridine.

References Cited in the file of this patent
UNITED STATES PATENTS
2,649,444    Barrett _____ Aug. 18, 1953

UNITED STATES PATENT OFFICE
CERTIFICATE OF CORRECTION

Patent No. 2,973,365                     February 28, 1961

Paul A. J. Janssen

It is hereby certified that error appears in the above numbered patent requiring correction and that the said Letters Patent should read as corrected below.

Column 2, line 56, for "reside" read -- residue --; column 4, line 9, for "88 mm." read -- 8 mm. --; column 8, line 10, for "fixture" read -- mixture --.

Signed and sealed this 10th day of October 1961.

(SEAL)
Attest:

ERNEST W. SWIDER
Attesting Officer

DAVID L. LADD
                                             Commissioner of Patents